US008727941B2

(12) United States Patent
Aoki

(10) Patent No.: US 8,727,941 B2
(45) Date of Patent: May 20, 2014

(54) ELECTRIC TOOL

(75) Inventor: Yonosuke Aoki, Anjo (JP)

(73) Assignee: Makita Corporation, Anjo-Shi (JP)

( * ) Notice: Subject to any disclaimer, the term of this patent is extended or adjusted under 35 U.S.C. 154(b) by 112 days.

(21) Appl. No.: 13/505,890

(22) PCT Filed: Oct. 20, 2010

(86) PCT No.: PCT/JP2010/068485
§ 371 (c)(1),
(2), (4) Date: Jun. 26, 2012

(87) PCT Pub. No.: WO2011/058855
PCT Pub. Date: May 19, 2011

(65) Prior Publication Data

US 2012/0289377 A1 Nov. 15, 2012

(30) Foreign Application Priority Data

Nov. 10, 2009 (JP) ................................. 2009-257408

(51) Int. Cl.
*B60W 10/02* (2006.01)
*B60W 10/08* (2006.01)

(52) U.S. Cl.
USPC ........................................................... 477/13

(58) Field of Classification Search
CPC ...... F16D 48/064; F16H 61/12; B60W 10/02; B60W 10/08; B25D 16/00
USPC ............................ 477/13, 177, 179, 181, 906
See application file for complete search history.

(56) References Cited

U.S. PATENT DOCUMENTS

| | | | | |
|---|---|---|---|---|
| 2,499,708 | A * | 3/1950 | Whitledge | 477/181 |
| 4,608,651 | A * | 8/1986 | Murakami et al. | 700/250 |
| 4,662,492 | A * | 5/1987 | Troeder | 477/177 |
| 5,401,124 | A | 3/1995 | Hettich | |
| 5,584,619 | A | 12/1996 | Guzzella | |
| 6,070,506 | A | 6/2000 | Becker | |
| 6,705,410 | B2 | 3/2004 | Ziegler | |
| 2002/0037785 | A1 | 3/2002 | Wissmach et al. | |

FOREIGN PATENT DOCUMENTS

| | | |
|---|---|---|
| CN | 1357435 A | 7/2002 |
| EP | 0 199 883 B1 | 8/1990 |
| EP | 1 398 119 A1 | 3/2004 |
| JP | A-61-226278 | 10/1986 |

(Continued)

OTHER PUBLICATIONS

Jun. 21, 2012 International Preliminary Report on Patentability (IPRP) issued in International Application No. PCT/JP2010/068485 (with translation).

(Continued)

*Primary Examiner* — Edwin A Young
(74) *Attorney, Agent, or Firm* — Oliff PLC

(57) ABSTRACT

An electric tool causes a drive mechanism to drive a tip tool to thereby cause the tip tool to perform predetermined work, and the drive mechanism is provided with a driving gear and a driven gear which meshes with the driving gear. The electric tool is configured in such a manner that an axial force or a radial force generated by the meshing between the driving gear and the driven gear is measured to detect the state of torque acting on the tip tool, and drive control of the drive mechanism is performed according to the detected state of torque.

8 Claims, 5 Drawing Sheets

(56) References Cited

FOREIGN PATENT DOCUMENTS

| | | |
|---|---|---|
| JP | U-1-60877 | 4/1989 |
| JP | U-01-121666 | 8/1989 |
| JP | A-5-220673 | 8/1993 |
| JP | U-07-022135 | 4/1995 |
| JP | A-7-253192 | 10/1995 |
| JP | A-8-1536 | 1/1996 |
| JP | A-2000-317852 | 11/2000 |
| JP | A-2002-156010 | 5/2002 |
| JP | A-2002-521220 | 7/2002 |
| JP | A-2004-261952 | 9/2004 |
| JP | A-2006-175547 | 7/2006 |
| JP | A-2008-57747 | 3/2008 |

OTHER PUBLICATIONS

International Search Report issued in International Patent Application No. PCT/JP2010/068485 (with translation).
Sep. 25, 2013 Extended European Search Report issued in European Application No. 10829815.9.
Jan. 29, 2014 Office Action issued in Japanese Patent Application No. 2009-257408.
Dec. 27, 2013 Office Action issued in Chinese Application No. 201080050490.6.

* cited by examiner

ELECTRIC TOOL

FIELD OF THE INVENTION

The present invention relates to an electric power tool which is capable of preventing reaction torque acting on a tool body when a tool bit is unintentionally locked.

BACKGROUND OF THE INVENTION

Japanese laid-open Patent Publication No. 2002-156010 discloses a hand-held power tool in which a planetary gear mechanism is utilized as a safety clutch. In a power tool such as a hammer drill, reaction torque acts on the tool body in an opposite direction from the direction of rotation of the hammer bit during hammer drill operation. When the hammer bit is unintentionally locked during hammer drill operation, reaction torque acting on the tool body increases and thus the tool body may be swung. In the known power tool, an outer ring member in the planetary gear mechanism is pressed and held by a contact element including a control means in the form of a brake shoe. When a tool bit is unintentionally locked during drilling operation, the outer ring member held by the contact element is released, so that the tool body is no longer acted upon by reaction torque and avoided from being swung.

In the known power tool, a torque limiter is formed by utilizing the planetary gear mechanism, but the power tool is increased in size due to its structure utilizing the planetary gear mechanism. In this point, further improvement is required.

DISCLOSURE OF THE INVENTION

Problems to be Solved by the Invention

Accordingly, it is an object of the present invention to provide an improved power tool which can detect torque acting on a tool bit during operation with a simple structure.

Means for Solving the Problems

In order to solve the above-described problem, according to a preferred embodiment of the present invention, a hand-held power tool is provided which causes a drive mechanism to drive a tool bit and thereby causes the tool bit to perform a predetermined operation. The drive mechanism has a driving-side gear and a driven-side gear which is engaged with the driving-side gear. The “power tool” in the present invention typically represents an electric hammer drill which performs a hammer drill operation by impact drive and rotary drive of the tool bit, or an electric drill which performs a drilling operation on a workpiece by rotary drive of the tool bit, but it suitably includes a grinding/polishing tool such as an electric disc grinder which performs grinding or polishing operation on a workpiece by rotary drive of the tool bit, a rotary cutting machine such as a circular saw for cutting a workpiece, and a screw tightening tool for screw tightening operation.

The present invention is characterized in that an axial force or a radial force caused by engagement between the driving-side gear and the driven-side gear is measured to detect torque acting on the tool bit, and driving of the drive mechanism is controlled according to this detected torque. Further, as the member for “detecting torque” in the present invention, typically, a detector using a strain gauge or a load cell can be suitably used. The manner of “controlling driving of the drive mechanism according to the torque” in the present invention when the force measured by the detecting member reaches a predetermined setting suitably includes a manner of interrupting power transmission of the drive mechanism by a clutch, a manner of de-energizing the motor and a manner of braking rotation of the drive mechanism.

According to the present invention, by provision of the construction in which the axial or radial force caused by engagement of the existing gears commonly provided in the drive mechanism is measured, torque acting on the tool bit can be detected with a simple structure.

According to a further embodiment of the present invention, the driving-side gear is formed by a bevel gear. The bevel gear has a property that the thrust load is caused in the axial direction because of its structure. In the present invention, torque acting on the tool bit can be rationally detected by utilizing such a property of the bevel gear.

According to a further embodiment of the present invention, in the construction in which the driving-side gear is formed by a bevel gear, the bevel gear is a helical bevel gear or a spiral bevel gear. By using a helical bevel gear or a spiral bevel gear, a heavier thrust load is caused in the axial direction by engagement between gears, compared with a straight bevel gear. According to the present invention, the detection accuracy of the detecting member can be improved by using a helical bevel gear or a spiral bevel gear as the bevel gear.

According to a further embodiment of the present invention, the power tool has an antifriction bearing that rotatably supports the driving-side gear, and a detecting member for detecting the torque measures an axial thrust load acting on an irrotational part of the antifriction bearing. Further, as the “anti friction bearing” in the present invention, both a ball bearing using a ball as a rolling element and a roller bearing using a roller can be applied. According to the present invention, with the construction in which the thrust load acting on the irrotational part of the antifriction bearing is measured, friction which may be caused by relative movement in a load transmitting region can be avoided.

According to a further embodiment of the present invention, the tool bit is configured as a hammer bit that performs a hammer drill operation on a workpiece by linear motion in an axial direction of the tool bit and rotation around its axis. A detecting member is provided on an intermediate shaft disposed in a middle region of a power transmitting path for transmitting torque to the hammer bit. For example, a final shaft (tool holder) for transmitting torque to the hammer bit is likely to be acted upon by an external force other than torque. In comparison, however, the intermediate shaft which is exclusively used for torque transmission is not likely to be acted upon by an external force other than torque. Therefore, by provision of the structure of measuring the thrust load or radial load which is caused as an axial or radial reaction force in the intermediate shaft, stable measurement can be realized.

According to a further embodiment of the present invention, driving of the drive mechanism is controlled by interrupting torque transmission to the tool bit. Specifically, a torque transmission interrupting mechanism is provided as a member for controlling driving of the drive mechanism and serves to interrupt torque transmission from the drive mechanism to the tool bit according to the detected torque. According to the present invention, excessive reaction torque can be prevented from acting on the power tool by interrupting torque transmission to the tool bit.

According to a further embodiment of the present invention, the torque transmission interrupting mechanism comprises an electromagnetic clutch having a driving-side rotating member, a driven-side rotating member, a biasing member that biases the rotating members away from each other so as to interrupt torque transmission, and an electromagnetic coil that brings the rotating members into contact with each other against a biasing force of the biasing member and transmits torque when the electromagnetic coil is energized. Specifically, torque transmission is interrupted by disengagement of the electromagnetic clutch. According to the present invention, by utilizing the electromagnetic clutch as the torque transmission interrupting mechanism, the clutch can be easily controlled and can be reduced in size.

Effect of the Invention

According to the present invention, an improved power tool is provided which can detect torque acting on a tool bit during operation with a simple structure. Other objects, features and advantages of the present invention will be readily understood after reading the following detailed description together with the accompanying drawings and the claims.

REPRESENTATIVE EMBODIMENT OF THE INVENTION

Each of the additional features and method steps disclosed above and below may be utilized separately or in conjunction with other features and method steps to provide and manufacture improved power tools and methods for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment of the Invention

Figure 1:
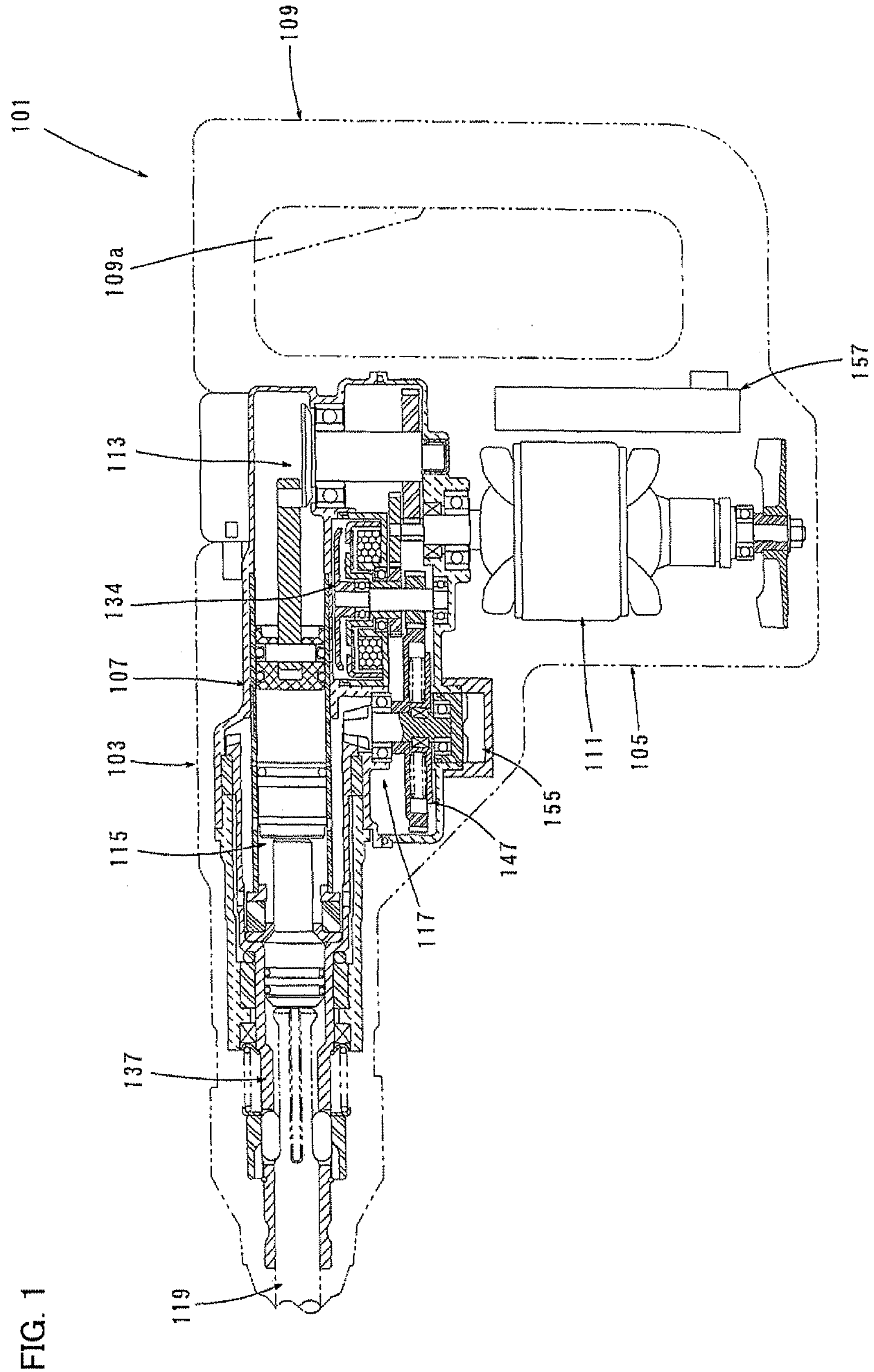
FIG. 1 is a sectional side view showing an entire structure of a hammer drill according to a first embodiment of the present invention.

A first embodiment of the present invention is now described with reference to FIGS. 1 and 4. In this embodiment, an electric hammer drill is explained as a representative example of the power tool. As shown in FIG. 1, the hammer drill 101 according to this embodiment mainly includes a tool body in the form of a body 103 that forms an outer shell of the hammer drill 101, a hammer bit 119 detachably coupled to a front end region (on the left as viewed in FIG. 1) of the body 103 via a hollow tool holder 137, and a handgrip 109 designed to be held by a user and connected to the body 103 on the side opposite to the hammer bit 119. The hammer bit 119 is held by the tool holder 137 such that it is allowed to linearly move with respect to the tool holder in its axial direction. The hammer bit 119 is a feature that corresponds to the "tool bit" according to the present invention. Further, for the sake of convenience of explanation, the side of the hammer bit 119 is taken as the front and the side of the handgrip 109 as the rear.

The body 103 includes a motor housing 105 that houses a driving motor 111, and a gear housing 107 that houses a motion converting mechanism 113, a striking mechanism 115 and a power transmitting mechanism 117. The driving motor 111, the motion converting mechanism 113, the striking mechanism 115 and the power transmitting mechanism 117 form the "drive mechanism" according to the present invention. The driving motor 111 is arranged such that its rotation axis runs in a vertical direction (vertically as viewed in FIG. 1) substantially perpendicular to a longitudinal direction of the body 103 (the axial direction of the hammer bit 119). The motion converting mechanism 113 appropriately converts torque (rotating output) of the driving motor 111 into linear motion and then transmits it to the striking mechanism 115. Then, an impact force is generated in the axial direction of the hammer bit 119 (the horizontal direction as viewed in FIG. 1) via the striking mechanism 115. The motion converting mechanism 113 and the striking mechanism 115 form the "impact drive mechanism" according to the present invention.

Further, the power transmitting mechanism 117 appropriately reduces the speed of torque of the driving motor 111 and transmits it to the hammer bit 119 via the tool holder 137, so that the hammer bit 119 is caused to rotate in its circumferential direction. The driving motor 111 is driven when a user depresses a trigger 109*a* disposed on the handgrip 109. The power transmitting mechanism 117 forms the "rotary drive mechanism" according to the present invention.

Figure 2:
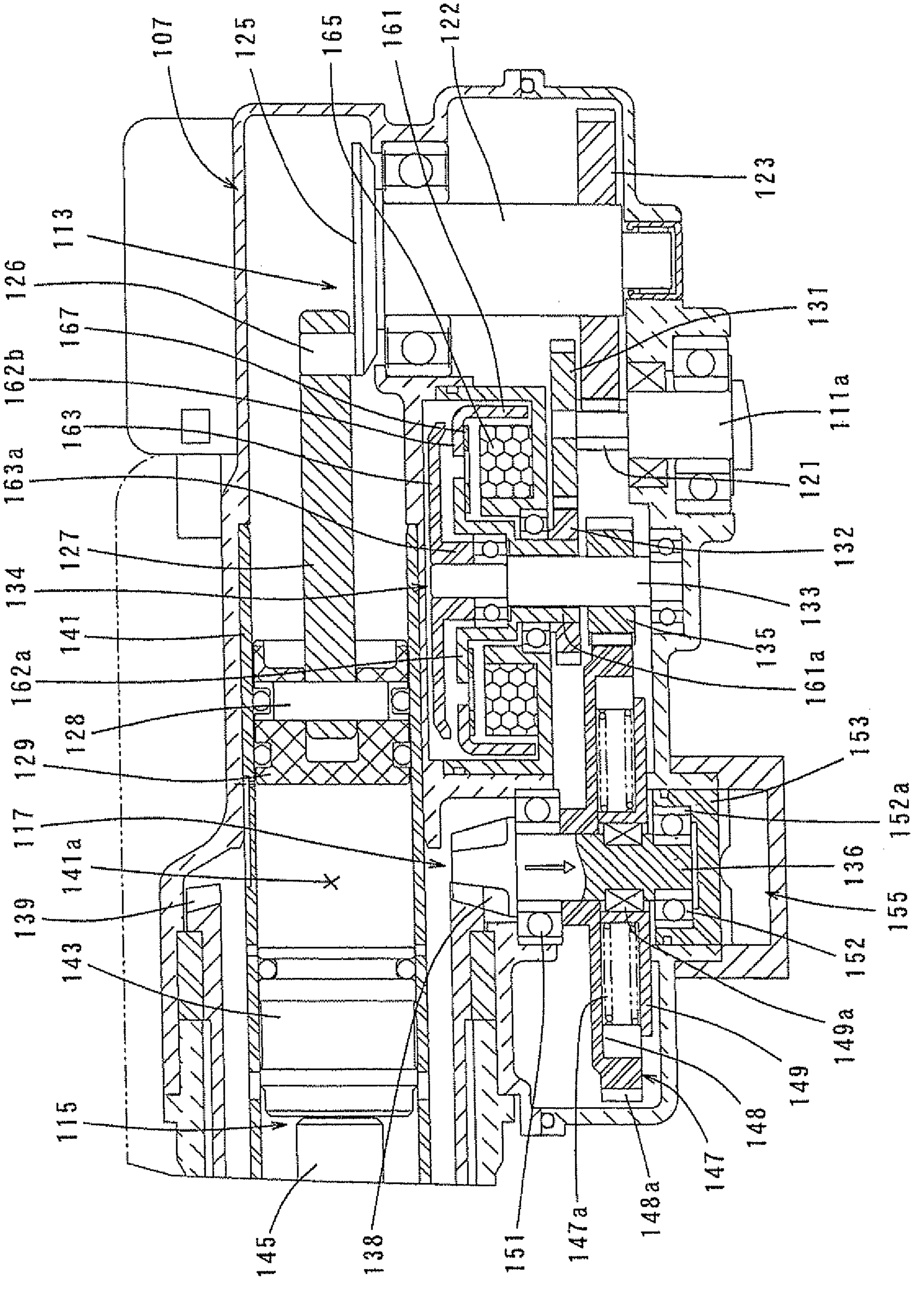
FIG. 2 is an enlarged sectional view showing a part of FIG. 1.

As shown in FIG. 2, the motion converting mechanism 113 mainly includes a first driving gear 121 that is formed on an output shaft (rotating shaft) 111*a* of the driving motor 111 and caused to rotate in a horizontal plane, a driven gear 123 that engages with the first driving gear 121, a crank shaft 122 to which the driven gear 123 is fixed, a crank plate 125 that is caused to rotate in a horizontal plane together with the crank shaft 122, a crank arm 127 that is loosely connected to the crank plate 125 via an eccentric shaft 126, and a driving element in the form of a piston 129 which is mounted to the crank arm 127 via a connecting shaft 128. The output shaft 111*a* of the driving motor 111 and the crank shaft 122 are disposed side by side in parallel to each other. The crank shaft 122, the crank plate 125, the eccentric shaft 126, the crank arm 127 and the piston 129 form a crank mechanism. The piston 129 is slidably disposed within a cylinder 141. When the driving motor 111 is driven, the piston 129 is caused to linearly move in the axial direction of the hammer bit 119 along the cylinder 141.

The striking mechanism 115 mainly includes a striking element in the form of a striker 143 slidably disposed within the bore of the cylinder 141, and an intermediate element in the form of an impact bolt 145 that is slidably disposed within the tool holder 137 and serves to transmit kinetic energy of the striker 143 to the hammer bit 119. An air chamber 141*a* is formed between the piston 129 and the striker 143 in the cylinder 141. The striker 143 is driven via pressure fluctuations (air spring action) of the air chamber 141*a* of the cylinder 141 by sliding movement of the piston 129. The striker 143 then collides with (strikes) the impact bolt 145 which is slidably disposed in the tool holder 137. As a result, a striking force caused by the collision is transmitted to the hammer bit 119 via the impact bolt 145. Specifically, the motion converting mechanism 113 and the striking mechanism 115 for driving the hammer bit 119 by impact are directly connected to the driving motor 111.

The power transmitting mechanism 117 mainly includes a second driving gear 131, a first intermediate gear 132, a first intermediate shaft 133, an electromagnetic clutch 134, a second intermediate gear 135, a mechanical torque limiter 147, a second intermediate shaft 136, a small bevel gear 138, a large bevel gear 139 and the tool holder 137. The power transmitting mechanism 117 transmits torque of the driving motor 111 to the hammer bit 119. The second driving gear 131 is fixed to the output shaft 111*a* of the driving motor 111 and caused to rotate in the horizontal plane together with the first driving gear 121. The first and second intermediate shafts 133, 136 are located downstream from the output shaft 111*a* in a torque transmission path and disposed side by side in parallel to the output shaft 111*a*. The first intermediate shaft 133 is provided as a shaft for mounting the clutch and disposed between the output shaft 111*a* and the second intermediate shaft 136. The first intermediate shaft 133 is rotated via the electromagnetic clutch 134 by the first intermediate gear 132 which is constantly engaged with the second driving gear 131. The speed ratio of the first intermediate gear 132 to the second driving gear 131 is set to be almost the same.

The electromagnetic clutch 134 serves to transmit torque or interrupt torque transmission between the driving motor 111 and the hammer bit 119 or between the output shaft 111*a* and the second intermediate shaft 136, and forms a torque transmission interrupting mechanism. Specifically, the electromagnetic clutch 134 is disposed on the first intermediate shaft 133 and serves to prevent the body 103 from being swung by interrupting torque transmission when the hammer bit 119 is unintentionally locked during hammer drill operation and reaction torque acting on the body 103 excessively increases. As described above, the power transmitting mechanism 117 for rotationally driving the hammer bit 119 is constructed to transmit torque of the driving motor 111 or interrupt the torque transmission via the electromagnetic clutch 134. Further, the electromagnetic clutch 134 is disposed above the first intermediate gear 132 in the axial direction of the first intermediate shaft 133 and located closer to the axis of motion (axis of striking movement) of the striker 143 than the first intermediate gear 132.

The electromagnetic clutch 134 mainly includes a circular cup-shaped driving-side rotating member 161 and a disc-like driven-side rotating member 163 which are opposed to each other in their axial direction, a biasing member in the form of a spring disc 167 which constantly biases the driving-side rotating member 161 in a direction that releases engagement (frictional contact) between the driving-side rotating member 161 and the driven-side rotating member 163, and an electromagnetic coil 165 that engages the driving-side rotating member 161 with the driven-side rotating member 163 against the biasing force of the spring disc 167 when it is energized.

A driving-side clutch part in the form of the driving-side rotating member 161 has a shaft (boss) 161*a* protruding downward. The shaft 161*a* is fitted onto the first intermediate shaft 133 and can rotate around its axis with respect to the first intermediate shaft 133. Further, the first intermediate gear 132 is fixedly mounted on the shaft 161*a*. Therefore, the driving-side rotating member 161 and the first intermediate gear 132 rotate together. A driven-side clutch part in the form of the driven-side rotating member 163 also has a shaft (boss) 163*a* protruding downward and the shaft 163*a* is integrally fixed on one axial end (upper end) of the first intermediate shaft 133. Thus, the driven-side rotating member 163 can rotate with respect to the driving-side rotating member 161. When the first intermediate shaft 133 integrated with the shaft 163*a* of the driven-side rotating member 163 is viewed as part of the shaft 163*a*, the shaft 163*a* and the shaft 161*a* of the driving-side rotating member 161 are coaxially disposed radially inward and outward. Specifically, the shaft 163*a* of the driven-side rotating member 163 is disposed radially inward, and the shaft 161*a* of the driving-side rotating member 161 is disposed radially inward. The shaft 161*a* of the driving-side rotating member 161, the shaft 163*a* of the driven-side rotating member 163 and the first intermediate shaft 133 form a clutch shaft.

Further, the driving-side rotating member 161 is divided into a radially inner region 162*a* and a radially outer region 162*b*, and the inner and outer regions 162*a*, 162*b* are connected by the spring disc 167 and can move in the axial direction with respect to each other. The outer region 162*b* is provided and configured as a movable member which comes into frictional contact with the driven-side rotating member 163. In the electromagnetic clutch 134 having the above-described construction, the outer region 162*b* of the driving-side rotating member 161 is displaced in the axial direction by energization or de-energization of the electromagnetic coil 165 based on a command from a controller 157. Torque is transmitted to the driven-side rotating member 163 when the electromagnetic clutch 134 comes into engagement (frictional contact) with the driven-side rotating member 163, while the torque transmission is interrupted when this engagement is released.

Further, the second intermediate gear 135 is fixed on the other axial end (lower end) of the first intermediate shaft 133, and torque of the second intermediate gear 135 is transmitted to the second intermediate shaft 136 via the mechanical torque limiter 147. The mechanical torque limiter 147 is provided as a safety device against overload on the hammer bit 119 and interrupts torque transmission to the hammer bit 119 when excessive torque exceeding a set value (hereinafter also referred to as a maximum transmission torque value) is exerted on the hammer bit 119. The mechanical torque limiter 147 is coaxially mounted on the second intermediate shaft 136.

The mechanical torque limiter 147 includes a driving-side member 148 which has a third intermediate gear 148*a* engaged with the second intermediate gear 135 and is loosely fitted on the second intermediate shaft 136, and a hollow driven-side member 149 which is loosely fitted on the second intermediate shaft 136 and connected thereto by a key 149*a*. Although not particularly shown, when the torque acting on the second intermediate shaft 136 (which corresponds to the torque acting on the hammer bit 119) is lower than or equal to the maximum transmission torque value which is preset by a spring 147*a*, torque is transmitted between the driving-side member 148 and the driven-side member 149. However, when the torque acting on the second intermediate shaft 136 exceeds the maximum transmission torque value, torque transmission between the driving-side member 148 and the driven-side member 149 is interrupted. Further, the speed ratio of the third intermediate gear 148*a* of the driving-side member 148 to the second intermediate gear 135 is set such that the third intermediate gear 148*a* rotates at a reduced speed compared with the second intermediate gear 135.

Torque is transmitted from the first intermediate shaft 133 to the second intermediate shaft 136 via the mechanical torque limiter 147 and then transmitted at a reduced rotation speed from a small bevel gear 138 which is integrally formed with the second intermediate shaft 136, to a large bevel gear 139 which is rotated in a vertical plane in engagement with the small bevel gear 138. Moreover, torque of the large bevel gear 139 is transmitted to the hammer bit 119 via a final output shaft in the form of the tool holder 137 which is connected with the large bevel gear 139. The second intermediate shaft 136 is rotatably supported by upper and lower bearings (ball bearings) 151, 512 and the lower bearing 152 is housed in a cup-shaped bearing cover 153 mounted to the gear housing 107.

When torque of the driving motor 111 is transmitted to the hammer bit 119, axial and radial forces (drive reaction forces) are caused in the small bevel gear 138 by engagement of the small bevel gear 138 with the large bevel gear 139 because of its structure. These forces act on the second intermediate shaft 136 integrally formed with the small bevel gear 138 as a thrust load and a radial load, respectively. In this embodiment, the thrust load is detected by a strain gauge load sensor in the form of a load cell 155, and torque acting on the hammer bit 119 is determined by this detected thrust load. The small bevel gear 138, the large bevel gear 139 and the load cell 155 are features that correspond to the "driving-side gear", the "driven-side gear" and the "detecting means", respectively, according to the present invention.

The small bevel gear 138 is engaged with the large bevel gear 139 in a lower region of a vertical plane of the large bevel gear 139. Therefore, as shown by an arrow in FIG. 2, the thrust load acts downwardly on the second intermediate shaft 136. The load cell 155 is fixedly mounted to a lower region of the gear housing 107 such that the load cell 155 faces an axial end surface of the bearing cover 153 which houses the lower bearing 152 of the second intermediate shaft 136. Further, a gauge part of the load cell 155 is disposed in contact with an axial end surface of the bearing cover 153 or a plane in a direction transverse to the axial direction of the second intermediate shaft 136. The load cell 155 measures the thrust load which is inputted via the second intermediate shaft 136, the lower bearing 152 and the bearing cover 153. In this embodiment, the small bevel gear 138 is a spiral bevel gear in which a tooth trace is cut in a direction obliquely twisted with respect to its rotation axis. By provision of the spiral bevel gear, a heavier axial thrust load can be obtained than a straight bevel gear having a tooth trace cut in parallel to its rotation axis.

A measured value measured by the load cell 155 is outputted to the controller 157. When the measured value inputted from the load cell 155 reaches a predetermined load setting, the controller 157 outputs a de-energization command to the electromagnetic coil 165 of the electromagnetic clutch 134 to disengage the electromagnetic clutch 134. Further, the user can arbitrarily change (adjust) the load setting by externally manually operating a load setting adjusting means (for example, a dial), which is not shown. The load setting adjusted by the load setting adjusting means is limited to within a range lower than the maximum transmission torque value set by the spring 147*a* of the mechanical torque limiter 147. The controller 157 forms a clutch control device and is a feature that corresponds to the "control means" according to the present invention.

In the hammer drill 101 constructed as described above, when the user holds the handgrip 109 and depresses the trigger 109*a* in order to drive the driving motor 111, the piston 129 is caused to linearly slide along the cylinder 141 via the motion converting mechanism 113. By this sliding movement, the striker 143 is caused to linearly move within the cylinder 141 via air pressure fluctuations or air spring action in the air chamber 141*a* of the cylinder 141. The striker 143 then collides with the impact bolt 145, so that the kinetic energy caused by this collision is transmitted to the hammer bit 119.

Torque of the driving motor 111 is transmitted to the tool holder 137 via the power transmitting mechanism 117. As a result, the tool holder 137 is rotated in a vertical plane and the hammer bit 119 is rotated together with the tool holder 137. Thus, the hammer bit 119 performs hammering movement in its axial direction and drilling movement in its circumferential direction, so that a hammer drill operation (drilling operation) is performed on a workpiece (concrete).

The hammer drill 101 according to this embodiment can be switched not only to the above-described hammer drill mode in which the hammer bit 119 is caused to perform hammering movement and drilling movement in the circumferential direction, but to drilling mode in which the hammer bit 119 is caused to perform only drilling movement, or to hammering mode in which the hammer bit 119 is caused to perform only hammering movement. When the operation mode (hammer drill mode and drilling mode) in which the hammer bit 119 is caused to perform drilling movement in its circumferential direction is selected (detected), the controller 157 outputs a command of energization of the electromagnetic coil 165 of the electromagnetic clutch 134. A mode switching mechanism is not directly related to this invention and therefore its description is omitted.

During the above-described hammer drill operation, as described above, the load cell 155 measures a thrust load caused in the small bevel gear 138 and the second intermediate shaft 136 and outputs it to the controller 157. When the hammer bit 119 is unintentionally locked for any cause and reaction torque acting on the boy 103 is increased, the thrust load acting on the small bevel gear 138 and the second intermediate shaft 136 is also increased. When the measured thrust load value inputted from the load cell 155 to the controller 157 reaches the load setting, the controller 157 outputs the command of de-energization of the electromagnetic coil 165 to disengage the electromagnetic clutch 134. Therefore, the electromagnetic coil 165 is de-energized and thus the electromagnetic force is no longer generated, so that the outer region 162*b* of the driving-side rotating member 161 is separated from the driven-side rotating member 163 by the biasing force of the spring disc 167.

Specifically, when the hammer bit 119 is unintentionally locked, the electromagnetic clutch 134 is switched from the torque transmission state to the torque transmission interrupted state, so that the torque transmission from the driving motor 111 to the hammer bit 119 is interrupted. Thus, the body 103 can be prevented from being swung by excessive reaction torque acting on the body 103 due to locking of the hammer bit 119. Control of switching the electromagnetic clutch 134 from the torque transmission state to the torque transmission interrupted state by the controller 157 is a feature that corresponds to the "control of driving of the drive mechanism" according to the present invention.

As described above, according to this embodiment, when torque of the driving motor 111 is transmitted to the hammer bit 119, an axial force caused by engagement between the small bevel gear 138 and the large bevel gear 139 is measured as the thrust load of the second intermediate shaft 136 by the load cell 155 and the torque acting on the hammer bit 119 is detected based on the measurement results. Specifically, in this embodiment, the load cell 155 measures the thrust load caused by engagement between the small bevel gear 138 and the large bevel gear 139 which are existing members of the power transmitting mechanism 117 for transmitting torque of the driving motor 111 to the hammer bit 119. Thus, torque acting on the hammer bit 119 can be detected with a simple structure.

Further, a straight bevel gear, a helical bevel gear and a spiral bevel gear are generally known as bevel gears, and in this embodiment, the spiral bevel gear is used by which the highest thrust load is caused during torque transmission, so that the measurement accuracy of the load cell 155 can be enhanced.

Further, in this embodiment, the load cell 155 receives the thrust load of the second intermediate shaft 136 from an outer ring 152*a* or an irrotational part of the bearing 152 via the bearing cover 153. With such a construction, the thrust load is transmitted to the load cell 155 in the irrotational state, so that any problem of friction is not caused.

In this embodiment, the thrust load of the second intermediate shaft 136 which is disposed in a middle region of a power transmission path in the power transmitting mechanism 117 is measured by the load cell 155. This second intermediate shaft 136 is exclusively used for torque transmission and hardly acted upon by an external force, for example, compared with a final shaft in the form of the tool holder 137. With such a construction in which the thrust load of the second intermediate shaft 136 is measured, stable measurement can be realized. Further, in the case of such a construction, it is less likely to be affected by an axial runout, so that stable measurement can be realized.

Further, in this embodiment, the electromagnetic clutch 134 is used for interrupting torque transmission from the driving motor 111 to the hammer bit 119, so that the torque interruption can be easily controlled.

In the mechanical torque limiter 147 disposed on the second intermediate shaft 136, the third intermediate gear 148*a* of the driving-side member 148 is configured such that its speed is reduced at a large speed ratio with respect to the second intermediate gear 135. Therefore, the mechanical torque limiter 147 has a large diameter and a heavy weight. In this embodiment, the driven-side member 149 of the mechanical torque limiter 147 is connected to the second intermediate shaft 136 via the key 149*a* so as to be allowed to move in its axial direction with respect to the second intermediate shaft 136. By provision of such a construction, measurement of the thrust load of the second intermediate shaft 136 by the load cell 155 is less likely to be affected by vibration or weight of the heavy mechanical torque limiter 147, so that the thrust load can be detected with stability.

Second Embodiment of the Invention

A second embodiment of the present invention is now explained with reference to FIG. 3. This embodiment is a modification to the first embodiment. Specifically, in the hammer drill 101, when torque of the driving motor 111 is transmitted to the hammer bit 119, a radial force caused by engagement between the small bevel gear 138 and the large bevel gear 139 is detected as a radial load of the second intermediate shaft 136. In the other points, it has the same construction as the above-described first embodiment. Therefore, components or elements which are substantially identical to those in the first embodiment are not described or only briefly described.

Figure 3:
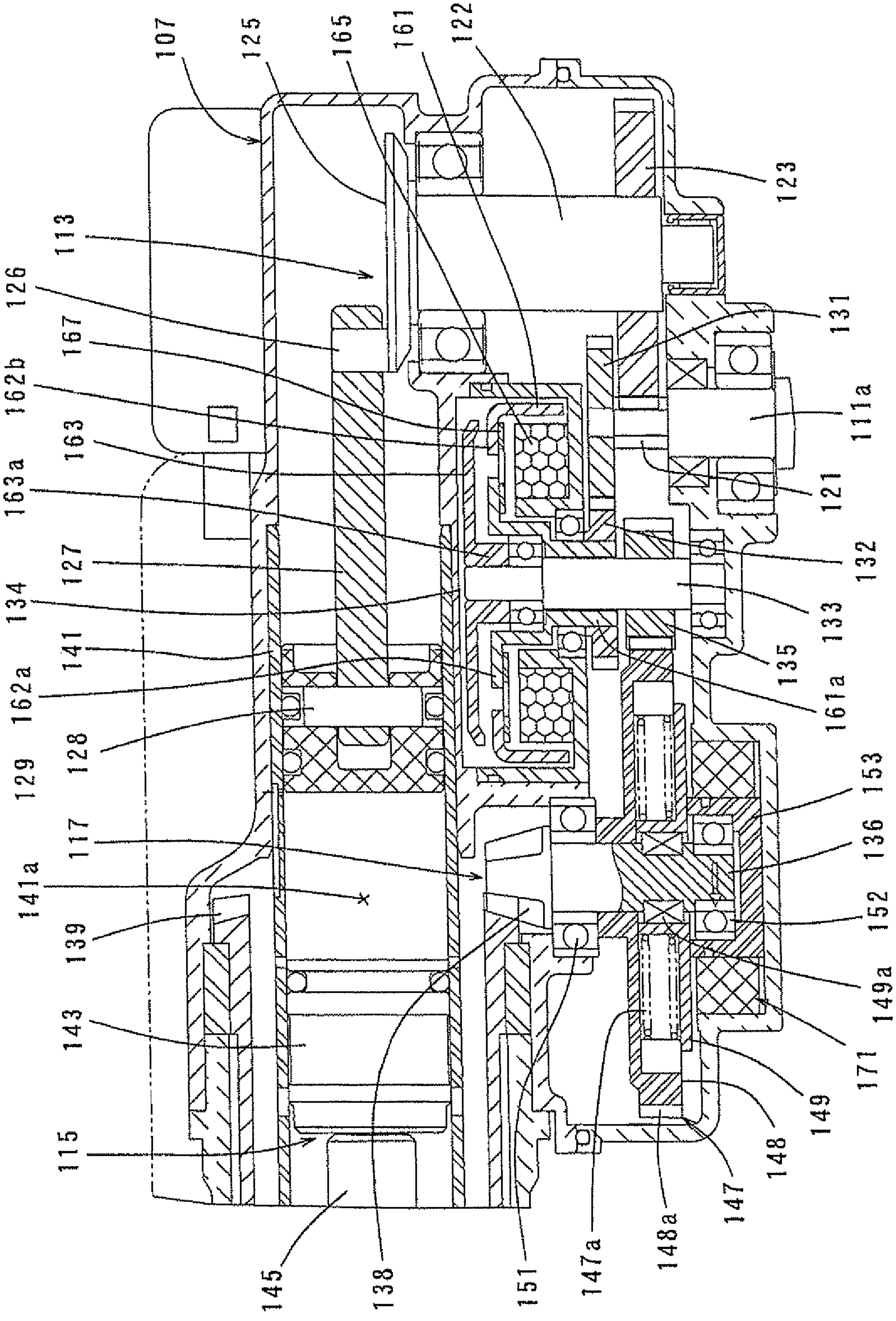
FIG. 3 is a sectional view showing a second embodiment of the present invention.

As shown in FIG. 3, in this embodiment, a load cell 171 is disposed in an outer peripheral region of the cup-shaped bearing cover 153 which houses the lower bearing 152 of the second intermediate shaft 136, and the radial load of the second intermediate shaft 136 is measured via the lower bearing 152 and the bearing cover 153. The measured value is then outputted to the controller 157. The radial load acting on the second intermediate shaft 136 is shown by an arrow in FIG. 3.

Therefore, when the hammer bit 119 is unintentionally locked during hammer drill operation and torque of the hammer bit 119 increases, the radial load acting on the small bevel gear 138 and the second intermediate shaft 136 also increases. When the measured value of the radial load inputted from the load cell 155 to the controller 157 reaches a predetermined load setting, the controller 157 outputs a command of de-energization of the electromagnetic coil 165 to disengage the electromagnetic clutch 134. Therefore, the electromagnetic clutch 134 is switched from the torque transmission state to the torque transmission interrupted state, so that the torque transmission from the driving motor 111 to the hammer bit 119 is interrupted. Thus, the body 103 can be prevented from being swung by excessive reaction torque acting on the body 103.

According to the second embodiment constructed as described above, the same effects as the above-described first embodiment can be obtained.

Further, in the above-described first and second embodiments, torque transmission by the electromagnetic clutch 134 is interrupted when the measured value of the load cell 155 exceeds a load setting. It can however be assumed, for example, that the user sets the load setting relatively high and performs an operation in readiness for locking of the hammer bit 119. Therefore, in order to cope with such a case, it may be constructed such that the controller 157 determines abnormal increase of torque by monitoring the average value of torque outputted from the load cell 155 or the increase rate of the torque within a unit of time and when it determines the torque has abnormally increased, it executes disengagement of the electromagnetic clutch 134 from the first intermediate gear 132. In the case of such a construction, torque transmission by the electromagnetic clutch 134 can be reliably interrupted when the hammer bit 119 is unintentionally locked. In this case, it may be constructed such that the increase rate of rapidly increasing torque can be controlled.

In the first and second embodiments, the electromagnetic clutch 134 is used as a torque transmission interrupting mechanism, but a de-energizing device which de-energizes the driving motor 111, or a brake which stops or reduces the speed of rotation of the driving motor 111 may also be used in place of the electromagnetic clutch 134.

Further, in the first and second embodiments, the driving-side gear in the form of the small bevel gear 138 is integrally formed with the second intermediate shaft 136, but they may be separately formed and connected by a key or by spline fitting such that they can move in the axial direction with respect to each other.

Third Embodiment of the Invention

A third embodiment of the present invention is now explained with reference to FIGS. 4 and 5. This embodiment is a representative example applied to an electric circular saw 201. In the electric circular saw 201, when an excessive torque acts on a disc-like blade (saw blade) 219 during operation of cutting a workpiece by the blade 219, the electric circular saw 201 may be caused to rise while retracting rearward in a cutting direction, or a kickback may occur. It is therefore an object of this embodiment to prevent or alleviate this kickback.

Figure 4:
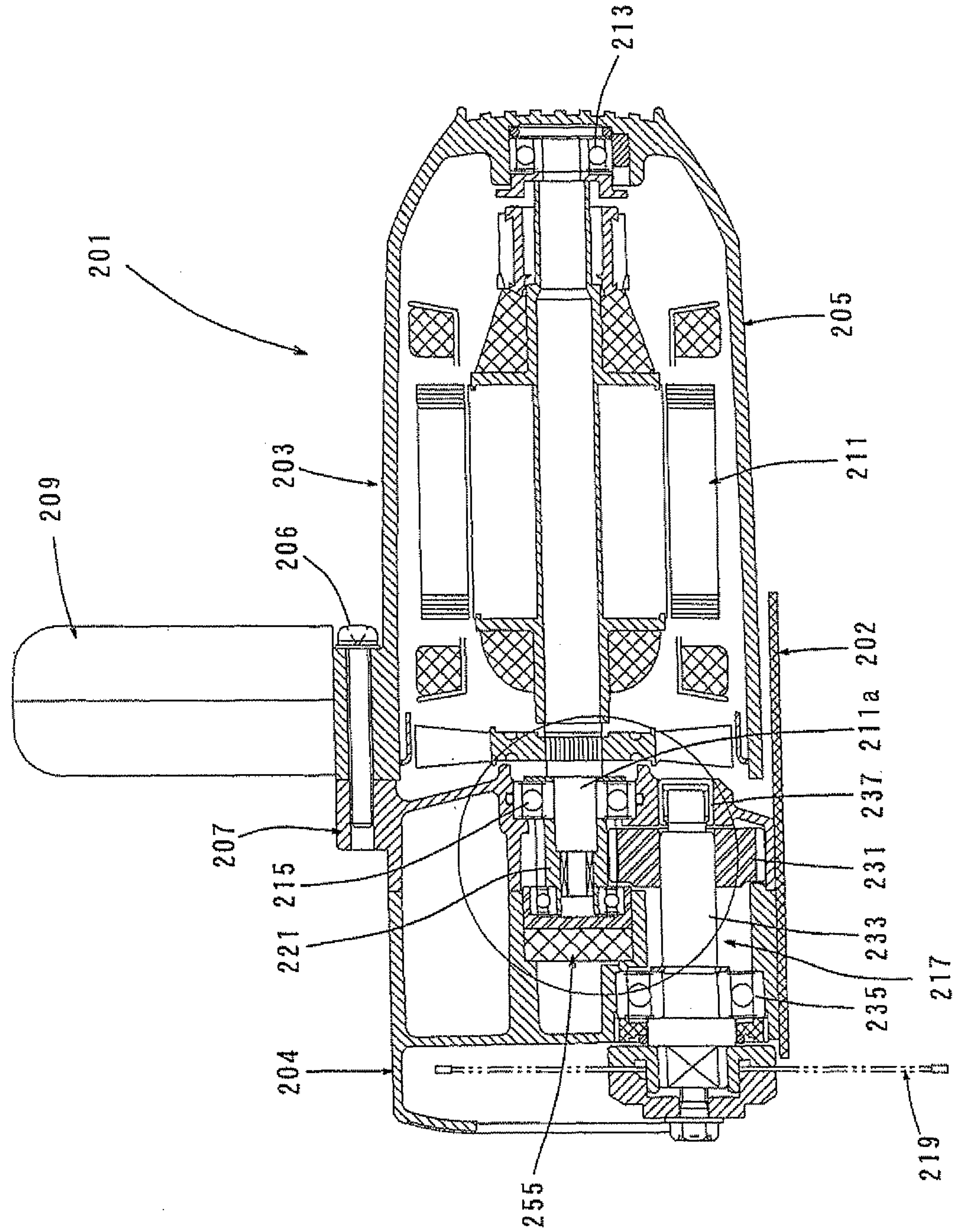
FIG. 4 is a sectional side view showing an entire structure of an electric circular saw according to a third embodiment of the present invention.

As shown in FIG. 4, the electric circular saw 201 according to this embodiment has a base 202 which can be placed on a workpiece (not shown), and a tool body in the form of a circular saw body 203 connected to the base 202.

The circular saw body 203 mainly includes a blade case 204 that covers substantially an upper half of the disc-like blade 219 which is caused to rotate in a vertical plane, a motor housing 205 that houses a driving motor 211, a gear housing 207 that houses a power transmitting mechanism 217, and a handgrip (handle) 209 designed to be held by a user to operate the electric circular saw 201. The blade 219 is a feature that corresponds to the "tool bit" according to the present invention, and the driving motor 211 and the power transmitting mechanism 217 form the "drive mechanism" according to the present invention. Further, the blade case 204 and the gear housing 207 are integrally connected to each other and the motor housing 205 is connected to the gear housing 207 by a bolt 206. The handgrip 209 is integrally formed on the top of the motor housing 205 and has a trigger switch (not shown) for energizing the driving motor 211.

The driving motor 211 is disposed such that its rotation axis (an output shaft 211*a*) extends in parallel to the rotation axis of the blade 219 or in a direction perpendicular to a direction of movement of the electric circular saw 201 during cutting operation. The output shaft 211*a* of the driving motor 211 extends substantially horizontally and is rotatably supported at both axial ends by bearings (ball bearings) 213,215.

Figure 5:
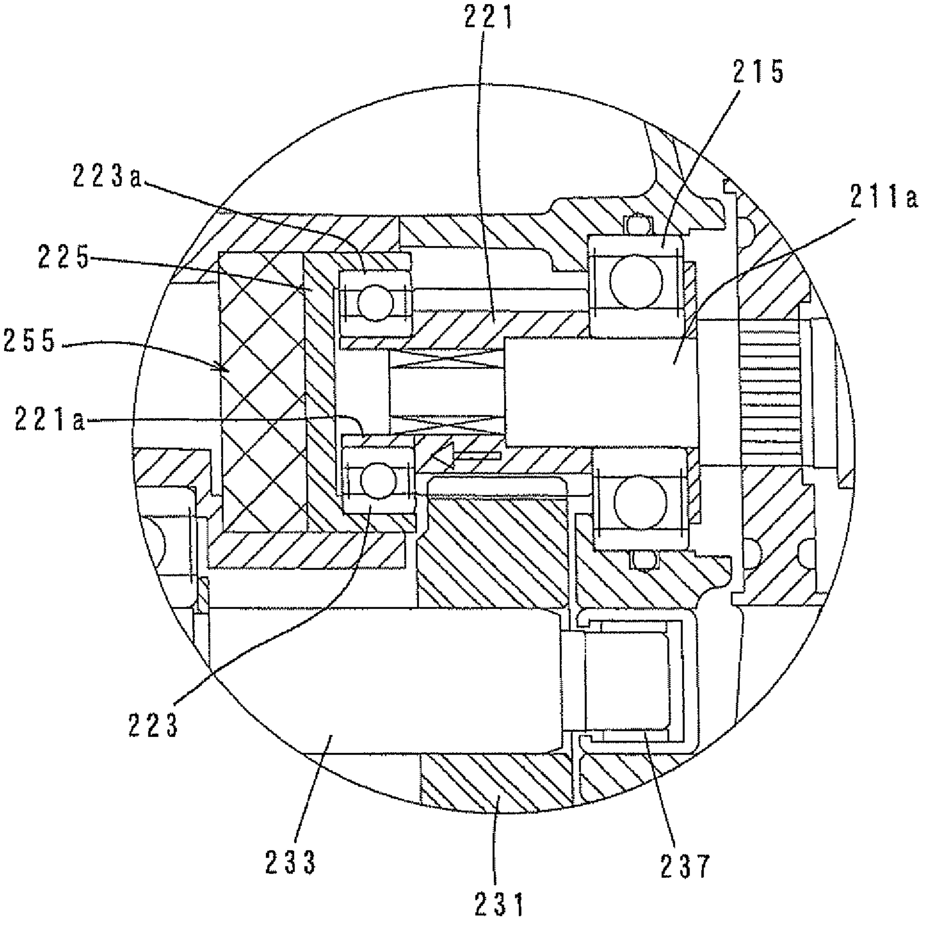
FIG. 5 is an enlarged sectional view showing a part of FIG. 4.

As shown in FIG. 5, a driving gear 221 is spline-fitted onto one end (front end) of the output shaft 211*a* (on the blade 219 side) such that it is allowed to move in its axial direction with respect to the output shaft 211*a* and rotates together with the output shaft 211*a*. A shaft part 221*a* having a smaller diameter than a tooth part is formed on the end of the driving gear 221 on the blade 219 side (on the side opposite to the driving motor 211). Further, the shaft part 221*a* is rotatably supported on the gear housing 207 via a bearing (ball bearing) 223. The bearing 223 is supported on the blade case 204 via a cup-shaped bearing cover 225.

As shown in FIG. 4, a power transmitting mechanism 217 mainly includes a driving gear 221 fitted onto the output shaft 211*a*, a driven gear 231 which is engaged with the driving gear 221, and a blade shaft 233 onto which the driven gear 231 is fitted. The blade shaft 233 is disposed in parallel to the output shaft 211*a* of the driving motor 211. One axial end of the blade shaft 233 is rotatably supported on the blade case 204 via a bearing (ball bearing) 235, while the other end is rotatably supported on the gear housing 207 via a bearing (needle bearing) 237. The driven gear 231 is press-fitted onto the blade shaft 233 such that it rotates together with the blade shaft 233. Further, the blade 219 is removably attached to a front end of the blade shaft 233.

In this embodiment, both the driving gear 221 and the driven gear 231 are helical gears. Therefore, during rotary drive of the blade 219, when torque is transmitted between the driving gear 221 and the driven gear 231 which are engaged with each other, an axial force and a radial force, or a thrust load and a radial load act on the driving gear 221. In this embodiment, as shown by an arrow in FIG. 5, it is configured such that the thrust load acts on the driving gear 221 toward the front end of the output shaft 211*a* (toward the blade 219). The thrust load is detected by the strain gauge load sensor in the form of a load cell 255, and torque acting on the blade 219 is determined by this detected thrust load. The driving gear 221, the driven gear 231 and the load cell 255 are features that correspond to the "driving-side gear", the "driven-side gear" and the "detecting means", respectively, according to the present invention.

The load cell 255 is fixedly mounted to the blade case 204 such that it faces the bearing cover 225 in a front end region of the driving gear 221 (a front end region of the output shaft 211*a*). Further, a gauge part of the load cell 255 is disposed in contact with an axial end surface of the bearing cover 225 or a plane in a direction transverse to the axial direction of the driving gear 221. The load cell 255 measures the thrust load which is inputted from the driving gear 221 via the bearing 223 and the bearing cover 225.

A measured value measured by the load cell 255 is outputted to a controller (not shown) which serves to control driving of the driving motor 211. When the measured value inputted from the load cell 255 reaches a predetermined load setting, the controller outputs a de-energization command to stop the driving motor 211. A control of stopping the driving motor 211 by the command of de-energization of the controller is a feature that corresponds to the "control of driving of the drive mechanism" according to the present invention. Further, preferably, it is constructed such that the user can arbitrarily change (adjust) the load setting by externally manually operating a load setting adjusting means (for example, a dial).

In the electric circular saw 201 constructed as described above, when the user holds the handgrip 209 of the electric circular saw 201 and depresses the trigger switch in order to drive the driving motor 211, the blade 219 is rotationally driven. Thereafter, the front end of the base 202 is placed on the workpiece to be cut and the electric circular saw 201 is moved forward, so that the workpiece can be cut by the blade 219.

As described above, during the above-described cutting operation, the thrust load caused in the driving gear 221 is measured by the load cell 255 and outputted to the controller. When torque acting on the blade 219 increases for any cause, the thrust load acting on the driving gear 221 also increases. When the measured value of the thrust load inputted from the load cell 255 to the controller reaches the predetermined load setting, the controller outputs a command of de-energization to the driving motor 211. Thus, the driving motor 211 is stopped, so that a kickback of the electric circular saw 201 which may be caused if excessive torque acts on the blade 219 can be prevented or alleviated.

As described above, in this embodiment, it is constructed to measure the axial thrust load caused by engagement between the driving gear 221 and the driven gear 231 which are existing members of the power transmitting mechanism 217 for transmitting torque of the driving motor 211 to the blade 219. Therefore, like in the first embodiment, torque acting on the blade 219 can be detected with a simple structure.

Further, in this embodiment, the load cell 255 receives the thrust load of the driving gear 221 from an outer ring 223*a* or an irrotational part of the bearing 223 via the bearing cover 225. With such a construction, the thrust load is transmitted to the load cell 255 in the irrotational state, so that any problem of friction is not caused. Further, in the case of the construction in which the thrust load is measured, it is less likely to be affected by an axial runout, so that stable measurement can be realized.

Further, although not shown, as a modification to the above-described third embodiment, it may be constructed such that the load cell 255 measures the thrust load of the driven gear 231 fitted onto the blade shaft 233 so that torque acting on the blade 219 can be detected.

The blade shaft 233 onto which the driven gear 231 is fitted is acted upon by external forces (vibrations) in the axial and radial directions via the blade 219. Therefore, in the case of a construction in which the thrust load acting on the driven gear 231 is detected by the load cell 255, the external forces inputted to the blade shaft 233 adversely affects the detection accuracy of the load cell 255.

Therefore, in this modification, the driven gear 231 is connected to the blade shaft 233 via a key or by spline fitting such that it can rotate together with the blade shaft 233 and move in the axial direction with respect to the blade shaft 233. Further, the bearing 237 is changed, for example, from the needle bearing as shown in the drawing to a ball bearing and it is constructed such that the thrust load acting on the driven gear 231 via the ball bearing is detected by a load cell (not shown). Alternatively, it is constructed such that a bearing cover for housing the ball bearing is disposed in contact with one axial end of the driven gear 231 and the thrust load acting on the driven gear 231 via the ball bearing and the bearing cover is detected by the load cell (not shown).

Specifically, according to this modification, by provision of the above-described construction, the thrust load acting on the driven gear 231 on the blade shaft 233 can be measured by the load cell with stability without any influence of the external forces acting on the blade shaft 233. Torque acting on the blade 219 is detected from the measured value, and when excessive torque acts on the blade 219, the rotary drive of the blade 219 is stopped by de-energizing the driving motor 211, so that a kickback of the electric circular saw 201 can be prevented or alleviated.

Further, in the third embodiment and its modification, when torque of the blade 219 is determined to be abnormal, the rotary drive of the blade 219 is stopped by de-energizing the driving motor 211, but it may also be constructed such that the rotation speed of the driving motor 211 is controlled, for example, to be reduced to a proper speed.

Further, the electric hammer drill 101 and the electric circular saw 201 are explained as representative examples of the power tool, but the present invention can also be applied to other power tools such as an electric disc grinder for use in grinding or polishing operation, or a screw tightening machine for screw tightening operation.

In view of the scope and spirit of the above-described invention, the following features can be provided.

(1)

"The power tool as defined in claim 6, comprising a bearing cover that houses the antifriction bearing, wherein the load cell is disposed in contact with an axial end surface of the bearing cover."

(2)

"The power tool as defined in claim 6 or (1), comprising a torque limiter that interrupts torque transmission to the tool bit when torque exceeding a predetermined maximum transmission torque value acts on the tool bit, the torque limiter being mounted to a shaft which rotates together with the driving gear such that the torque limiter can rotate together with the shaft and move in an axial direction of the torque limiter with respect to the shaft."

(3)

"The power tool as defined in any one of claims 1 to 5, comprising an antifriction bearing that rotatably supports the driving-side gear, wherein a detecting member for detecting the torque measures a radial load acting on an irrotational part of the antifriction bearing in a radial direction of the irrotational part."

(4)

"The power tool as defined in claim 1, wherein the tool bit comprises a blade that cuts a workpiece by rotating around an axis of the blade."

(5)

"The power tool as defined in (4), comprising an antifriction bearing that rotatably supports the driving-side gear, wherein the driving-side gear is mounted to the motor shaft such that the driving-side gear can rotate together with the motor shaft and move in an axial direction of the driving-side gear with respect to the motor shaft, and a detecting member for detecting the torque comprises a load cell that measures an axial thrust load acting on an irrotational part of the anti friction bearing."

(6)

"The power tool as defined in (4), wherein the driven-side gear is mounted to the blade shaft such that the driven-side gear can rotate together with the blade shaft and move in an axial direction of the driven-side gear with respect to the blade shaft, and a detecting member for detecting the torque comprises a load cell that measures an axial thrust load acting on the driven-side gear."

DESCRIPTION OF NUMERALS

101 hammer drill (power tool)
103 body (tool body)
105 motor housing
107 gear housing
109 handgrip
109*a* trigger
111 driving motor (drive mechanism)
111*a* output shaft
113 motion converting mechanism (drive mechanism)
115 striking mechanism (drive mechanism)
117 power transmitting mechanism (drive mechanism)
119 hammer bit (tool bit)
121 first driving gear
122 crank shaft
123 driven gear
125 crank plate
126 eccentric shaft
127 crank arm
128 connecting shaft
129 piston
131 second driving gear
132 first intermediate gear
133 first intermediate shaft
134 electromagnetic clutch (clutch)
135 second intermediate gear
136 second intermediate shaft
137 tool holder
138 small bevel gear (driving-side gear)
139 large bevel gear (driven-side gear)
141 cylinder
141*a* air chamber
143 striker
145 impact bolt
147 mechanical torque limiter
147*a* spring
148 driving-side member
148*a* third intermediate gear
149 driven-side member
149*a* key
151 upper bearing
152 lower bearing
152*a* outer ring
153 bearing cover
155 load cell (detecting means)
157 controller (control means)
161 driving-side rotating member
161*a* shaft part
162*a* inner peripheral region
162*b* outer peripheral region
163 driven-side rotating member
163*a* shaft part

165 electromagnetic coil
167 spring disc
171 load cell (detecting means)
201 electric circular saw (power tool)
202 base
203 circular saw body (tool body)
204 blade case
205 motor housing
206 bolt
207 gear housing
209 handgrip
211 driving motor (drive mechanism)
211*a* output shaft
213 bearing
215 bearing
217 power transmitting mechanism (drive mechanism)
219 blade (tool bit)
221 driving gear (driving-side gear)
221*a* shaft part
223 bearing
225 bearing cover
231 driven gear (driven-side gear)
233 blade shaft
235 bearing
237 bearing
255 load cell (detecting means)

The invention claimed is:

1. A power tool, which causes a drive mechanism to drive a tool bit and thereby causes the tool bit to perform a predetermined operation, the drive mechanism having a driving-side gear and a driven-side gear which is engaged with the driving-side gear, wherein:

an axial force or a radial force caused by engagement between the driving-side gear and the driven-side gear is measured to detect torque acting on the tool bit, and driving of the drive mechanism is controlled according to the detected torque.

2. The power tool as defined in claim 1, comprising a load cell that serves as a detecting member for detecting the torque and measures a thrust load acting on the driving-side gear in an axial direction of the driving-side gear or a radial load acting on the driving-side gear in a radial direction of the driving-side gear.

3. The power tool as defined in claim 1, comprising a torque transmission interrupting mechanism that serves as a member for controlling driving of the drive mechanism and interrupts torque transmission from the drive mechanism to the tool bit according to the detected torque.

4. The power tool as defined in claim 3, wherein the torque transmission interrupting mechanism comprises an electromagnetic clutch having a driving-side rotating member, a driven-side rotating member, a biasing member that biases the rotating members away from each other so as to interrupt torque transmission, and an electromagnetic coil that brings the rotating members into contact with each other against a biasing force of the biasing member and transmits torque when the electromagnetic coil is energized.

5. The power tool as defined in claim 1, wherein the driving-side gear comprises a bevel gear.

6. The power tool as defined in claim 5, wherein the bevel gear comprises a helical bevel gear or a spiral bevel gear.

7. The power tool as defined in claim 1, comprising an antifriction bearing that rotatably supports the driving-side gear, wherein a detecting member for detecting the torque measures an axial thrust load acting on an irrotational part of the antifriction bearing.

8. The power tool as defined in claim 1, wherein the tool bit is configured as a hammer bit that performs a hammer drill operation on a workpiece by linear motion in an axial direction of the tool bit and rotation around an axis of the tool bit, and a detecting member for detecting the torque is provided on an intermediate shaft disposed in a middle region of a power transmitting path for transmitting torque to the hammer bit.

* * * * *